E. W. Blake,
Stone Crushing Machine,
No. 2,145, Reissued Jan. 9, 1866.
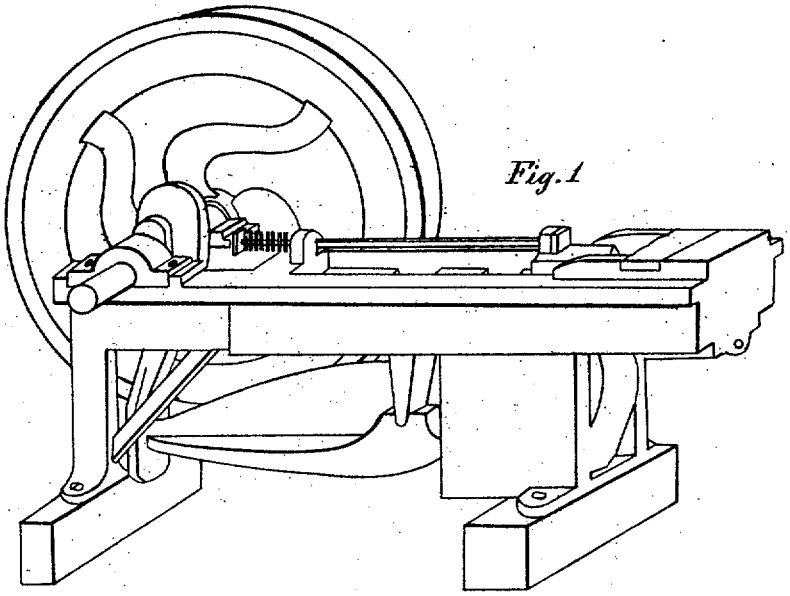
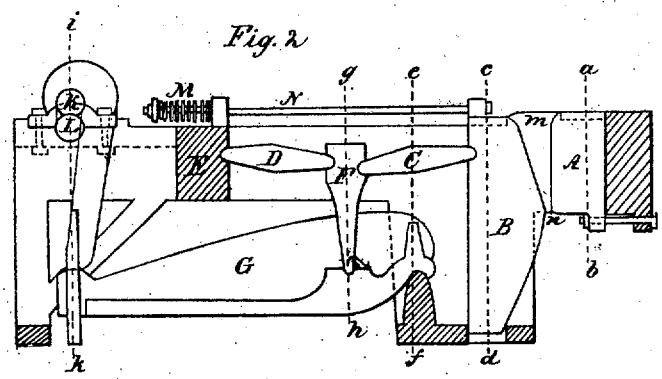
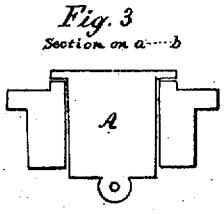
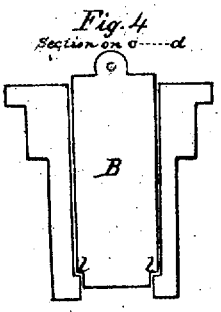
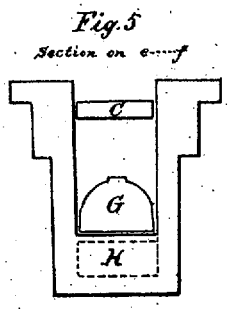
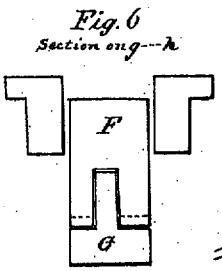
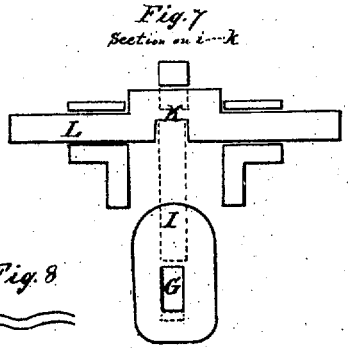
Fig. 8
Witnesses
L. Downes
Jno. D. Crosby
Inventor
Eli W. Blake by
A. Pollok
his atty

UNITED STATES PATENT OFFICE.

ELI W. BLAKE, OF NEW HAVEN, CONNECTICUT.

IMPROVEMENT IN STONE-BREAKERS.

Specification forming part of Letters Patent had No. 20,542, dated June 15, 1858: Reissue No. 2,145, dated January 9, 1866.

*To all whom it may concern:*

Be it known that I, ELI W. BLAKE, of New Haven, in the county of New Haven and State of Connecticut, have invented a new and useful machine for breaking stones for road, metal, and other purposes, which machine I call a "Stone-Breaker;" and I do hereby declare that the following is a full, clear, and exact description of the construction and operation of the same, reference being had to the annexed drawings, making part of this specification.

My stone breaker, so far as respects its principle or its essential characteristics, consists of two jaws, between which the stones are to be broken, having their acting faces so nearly in an upright position that stones will descend by their own gravity between them, and convergent downward one toward the other in such manner that while the space between them at the top is such as to receive the stones that are to be broken, that at the bottom is only sufficient to allow the fragments to pass when broken to the required size; and of a revolving shaft, driven by steam or other power, which is made to impart to one of these jaws a continual vibratory movement, causing it to alternately advance toward and recede from the other jaw through a short and definitely limited space. Hence when the shaft is revolved and a stone is dropped into the space between the jaws, it falls down until its further descent is arrested between their convergent faces. The movable jaw, advancing, crushes it; then, receding, liberates the fragments, and they again descend, and if too large are again arrested and crushed, and so on until all the fragments having been sufficiently reduced have passed out through the narrow space at the bottom.

In order that the machine may be adjusted to produce fragments of any desired size, I make provision for varying the distance beteen the jaws at the bottom at pleasure, and as the resistance to the motion of the jaw and shaft is very great when the jaw is advancing, and little or nothing during its receding movement, I have combined with the movable jaw and shaft a fly-wheel, for the purpose of rendering the strain upon the driving-power more equable.

The details of the structure of the machine—such as the manner of supporting the jaws in their proper relative position, and of imparting the definite motion with the required power to the movable jaw from the revolving shaft—may be varied indefinitely without affecting its principle of operation. I proceed to give a full description of all the parts of the machine as I have constructed it.

The machine may be made of any size, varying according to the size of the stones it is to be capable of receiving and the amount of work it is to accomplish; and its proportions, having reference to strength, may be varied according to the hardness of the material on which it is to operate.

The annexed drawings represent, on a scale of three thity-seconds of an inch to an inch, a machine which I have constructed that was designed to be capable of breaking blocks of trap-rock not exceeding three and a half inches thick and nine inches square, and which I have found fully competent to perform that work.

Figure 1 is a perspective view of the machine, shown as resting on two timbers, to which it is secured by bolts. In this figure most of the parts of the machine are partially concealed from view by the main frame or casting, which supports all the other parts. Fig. 2 is an orthographic view of all the parts in place, as they would appear upon removing one side of the main frame. Figs. 3, 4, 5, 6, 7 are transverse sections of the machine at the several points indicated on Fig. 2.

In Fig. 2 the parts of the drawings which are shaded by diagonal lines are sections of those parts of the main frame or casting which run transversely from one side to the other, connecting the two sides together, and which are supposed to be cut asunder in order to remove one side.

A is the stationary jaw. This is placed against one end of the frame, to which it is secured at the bottom by a bolt and at the top by lateral projections, which fit into corresponding recesses or notches in the top of the frame, as shown in Fig. 1, and in section, Fig. 3. By such a construction, making this jaw separate from the frame it can be removed when worn, and a new one readily substituted in its place.

B is the movable jaw. This piece extends downward to and enters a mortise in the lower transverse part of the main casting, by which means its lower end is prevented from moving in either direction horizontally. To give it a vertical support it is provided with shoulders, (seen in section at *l l*, Fig. 4,) which rest upon the main casting at the ends of the mortise. These shoulders, and also the part which enters the mortise, are slightly rounded, as shown in Fig. 2, so as to allow the upper end to vibrate.

*m n* is the space between the acting faces of the jaws, into which the stones are introduced. This space is sufficiently wide at *m* to receive the largest pieces of stone which the machine is designed to break, and thence converges downward to a width at *n* which is only sufficient to allow the fragments to pass when broken to the required size.

The acting-faces of the jaws are not plane surfaces, but are corrugated, the corrugations running vertically, so that a section of the opening *n* by a horizontal plane would present the outlines shown in Fig. 8. These corrugations serve to diminish the strain to which large pieces of stone would otherwise subject the machine, and also to prevent their fragments of large breadth from passing through the opening *n*.

The two pieces C and D, with the intervention of the piece F, constitute an elbow-joint, C and D, articulating on F at their adjacent ends and at their outer ends, one of them on the cross-bar E of the main frame, and the other on the back of the movable jaw.

The piece F at its lower end articulates on the lever G. This lever rests at one end on the fulcrum H, which forms a part of the main casting, and the other end is connected by the connecting-rod or piece I with the crank K of the shaft L. On one end of the shaft L is placed a fly-wheel, P, four feet in diameter, weighing seven hundred and fifty pounds, and on the other end a pulley (not shown in the drawings) to receive the belt which drives the machine. The spiral spring M, through the medium of the rod N, tends to hold the movable jaw back, thus keeping the pieces C and D in contact with their bearings and securing the return-motion of the jaw.

It is obvious that the revolution of the crank will vibrate the lever, and that this, through the medium of the pieces F, C, and D, will give a short and definitely-limited vibration to the movable jaw B. The entire operation of the machine will be understood without further explanation.

In order that the pieces C and D, when raised to their highest elevation, may not be retained there by the friction of their bearings, they should, when thus elevated, deviate from a line with each other by an angle of not less than five degrees; and in order that stones may not be ejected from the jaws without being crushed, the angle of convergence of their acting faces should not exceed eighteen degrees.

In order that I may vary the size of the opening *n*, so as to adjust the machine to produce fragments of any desired size, I provide several pieces C, differing slightly in length. Then by substituting a longer or shorter one the size of the opening may be diminished or increased at pleasure. By the same means the opening may be restored to the proper size when enlarged by wear.

To prevent the rapid wearing of the jaws, they should be made of hard iron and be well chilled, and to prevent the wearing away of the inside of the frame adjacent to the space where the stones are crushed, I contemplate casting the frame in such form as to receive these chilled pieces, which may be replaced when worn. I also contemplate making the movable jaw-piece in such form as to receive a separate piece of chilled iron for its acting face.

I also contemplate combining with the machine a revolving screen to remove the fragments as they fall from it and separate them into two or more sizes.

What I claim as my invention in the herein-described machine, and desire to secure by Letters Patent, is—

1. The combination, in a stone-breaking machine, of the upright convergent jaws with a revolving shaft and mechanism for imparting a definite reciprocating movement to one of the jaws from the revolving shaft, the whole being and operating substantially as set forth.

2. The combination, in a stone-breaking machine, of the upright movable jaw with the revolving shaft and fly-wheel, the whole being and operating substantially as set forth.

3. In combination with the upright converging jaws and the revolving shaft imparting a definitely limited vibration to the movable jaw, so arranging the jaws that they can be set at different distances from each other at the bottom, so as to produce fragments of any desired size.

ELI W. BLAKE.

Witnesses:
W. R. RONALDS,
M. N. HUTCHINSON.